US012386939B2

(12) United States Patent
Hastings

(10) Patent No.: US 12,386,939 B2
(45) Date of Patent: Aug. 12, 2025

(54) ZERO KNOWLEDGE CRYPTOGRAPHIC HASH IDENTITY VALIDATION

(71) Applicant: The Government of the United States of America, as represented by the Secretary of Homeland Security, Washington, DC (US)

(72) Inventor: William Hastings, Billings, MT (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/733,505

(22) Filed: Jun. 4, 2024

(65) Prior Publication Data

US 2024/0411849 A1    Dec. 12, 2024

Related U.S. Application Data

(60) Provisional application No. 63/472,520, filed on Jun. 12, 2023.

(51) Int. Cl.
| | |
|---|---|
| *G06F 21/34* | (2013.01) |
| *G06F 21/32* | (2013.01) |
| *G06K 19/07* | (2006.01) |

(52) U.S. Cl.
CPC .............. *G06F 21/34* (2013.01); *G06F 21/32* (2013.01); *G06K 19/0718* (2013.01)

(58) Field of Classification Search
USPC ......................................................... 726/18
See application file for complete search history.

(56) References Cited

U.S. PATENT DOCUMENTS 9,501,652 B2 * 11/2016 Paksoy ................... G06F 21/78
10,396,985 B1 * 8/2019 Nagelberg ............ H04L 9/3247
(Continued)

FOREIGN PATENT DOCUMENTS

WO    WO-2020247566 A1 * 12/2020 ............. G06F 21/32

OTHER PUBLICATIONS

Oztemel, Design and Construction of a Secure ID-card system using robust image hashing, Institute for Graduate Studies/BS in Electrical Engineering, Bilkent University, 2006 (Year: 2006).*

(Continued)

*Primary Examiner* — Sakinah White Taylor
(74) *Attorney, Agent, or Firm* — Kelly G. Hyndman; Robert W. Busby; William Washington

(57) ABSTRACT

Aspects of the present invention relate to machines, systems, and methods for using a zero knowledge hash function to verify validity of an ID. Certain configurations may provide machines, systems, and method for proving the ID is genuine, the information on the ID is correct, and the user presenting the ID is the same as the user in the ID. Some configurations may store a hash based on a one-way function of a data string created from information on the ID in a hashed data string database. Certain variations of the invention may query the database to verify the hashed data string exists in the database. Based on the response of the database to the query, a card authenticator may be configured to send a control transmission to an access control device to cause the access control device change from a first state to a second state.

30 Claims, 6 Drawing Sheets

(56) References Cited

U.S. PATENT DOCUMENTS

| | | | |
|---|---|---|---|
| 10,853,592 B2* | 12/2020 | Rodriguez | G06K 7/10297 |
| 11,190,355 B2* | 11/2021 | Wang | H04L 9/3231 |
| 11,477,017 B2 | 10/2022 | Newton et al. | |
| 11,620,387 B2 | 4/2023 | Campagna et al. | |
| 2010/0020151 A1* | 1/2010 | Jones | B42D 25/435 |
| | | | 235/488 |
| 2016/0117319 A9* | 4/2016 | Snyder | G06K 7/10009 |
| | | | 235/375 |
| 2017/0357979 A1* | 12/2017 | Khurana | G07F 7/0846 |
| 2018/0219681 A1* | 8/2018 | Geiman | H04L 9/3231 |
| 2020/0104826 A1* | 4/2020 | Rule | G06Q 20/3278 |
| 2021/0182371 A1* | 6/2021 | Ericson | G06F 21/32 |
| 2021/0211282 A1 | 7/2021 | Sitrick et al. | |
| 2022/0012672 A1* | 1/2022 | Inman | G06Q 10/1053 |
| 2023/0031087 A1* | 2/2023 | Tussy | G06F 21/32 |
| 2023/0237349 A1* | 7/2023 | Donoho | G06N 5/022 |
| | | | 706/46 |

OTHER PUBLICATIONS

Oztemel, Design and Construction of a Secure ID-card system using robust image hashing, Institute for Graduate Studies/BS in Electrical Engineering, Bilkent University, 2006 (Year: 2006).*

* cited by examiner

ZERO KNOWLEDGE CRYPTOGRAPHIC HASH IDENTITY VALIDATION

CROSS-REFERENCES

This application claims the benefit of priority to U.S. Provisional Patent Application No. 63/472,520 filed Jun. 12, 2023, incorporated by reference in its entirety.

STATEMENT OF GOVERNMENT INTEREST

The present invention was made by employees of the United States Department of Homeland Security in the performance of their official duties. The U.S. Government has certain rights in this invention.

FIELD

The invention relates generally to methods and systems for generating and authenticating an ID card.

BACKGROUND

Disclosed is a machine, system, and method for generating ID card such as licenses and passports. Additionally disclosed is a machine, system, and method for authenticating the ID.

SUMMARY

Aspects of the present invention relate to machines, systems, and methods for using a zero knowledge hash function to verify validity of an ID. Certain configurations may provide machines, systems, and method for proving the ID is genuine, the information on the ID is correct, and the user presenting the ID is the same as the user in the ID. Some configurations may store a hash based on a one-way function of a data string created from information on the ID in a hashed data string database. Certain variations of the invention may query the database to verify the hashed data string exists in the database. Based on the response of the database to the query, a card authenticator may be configured to send a control transmission to an access control device to cause the access control device change from a first state to a second state.

DETAILED DESCRIPTION

ID Card

Figure 1:
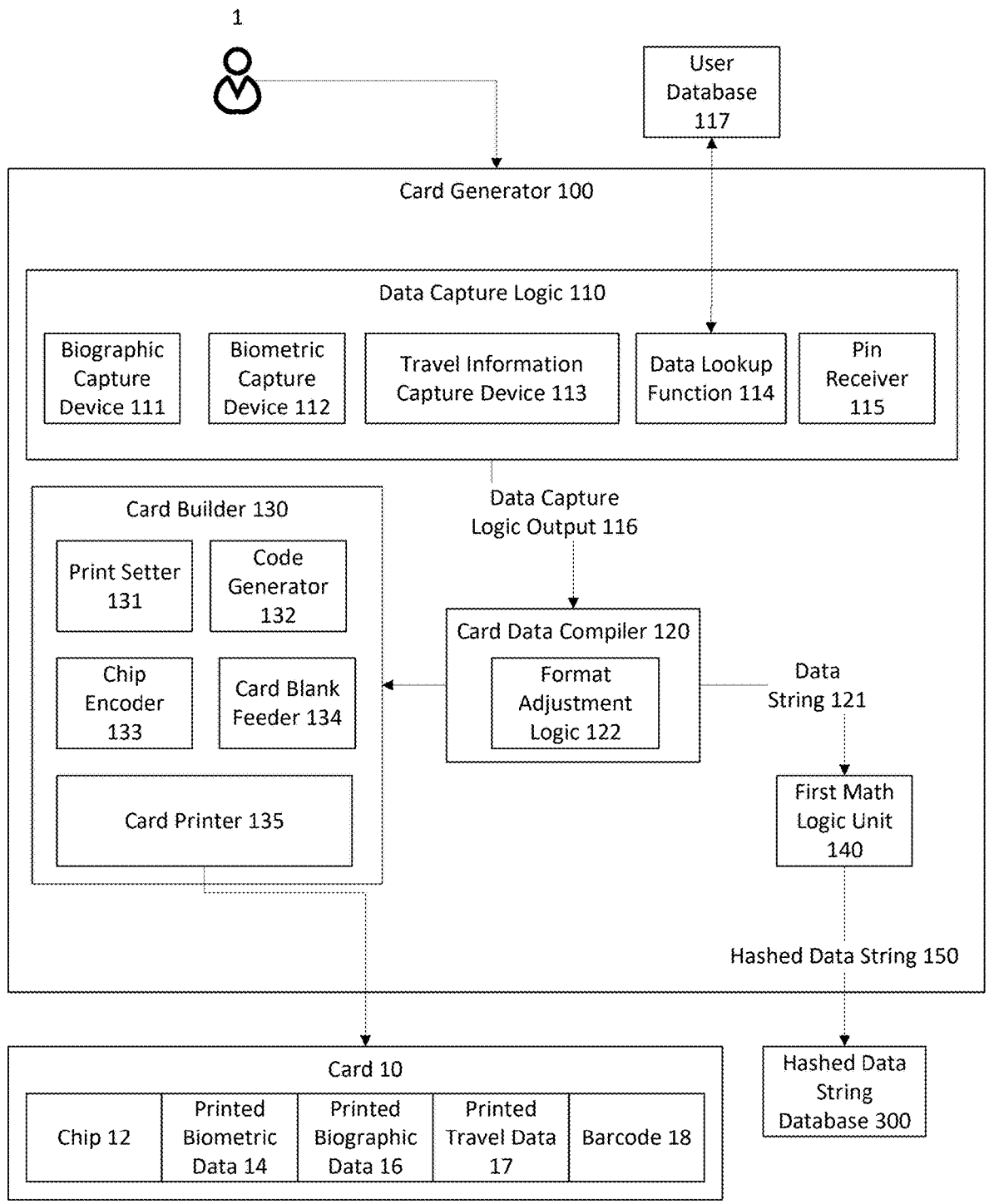
FIG. 1 is a schematic diagram of a card generator.

FIG. 1 illustrates a generated ID card 10 made by a card generator 100. An ID card 10 may comprise a chip 12, printed biometric data 14, printed biographic data 16, printed travel data 17, and a barcode 18.

Card Generator

FIG. 1 illustrates a card generator 100 for generating an ID card 10 of a user 1. A card generator 100 is a machine configured to generate ID cards 10 such as licenses, passports, and government IDs. The card generator 100 may also be configured to generate documents such as titles, registrations, tickets, contracts, deeds, warranties, etc. Configurations of the invention may be used with various types of cards such as a paper card, plastic card, cloth card, an electronic card, etc. The card data generator 100 may comprise components such as data capture logic 110, a card builder 130, a card data compiler 120, first math logic unit 140, etc.

A card generator is a machine configured to print cards. The card generator may have an attached computer or be configured to connect to a computer. The card generator may have a card blank feeder, paper tray, etc. The card generator 100 may comprise a housing or a case. The card generator 100 may comprise a power supply for supplying electricity to the card authenticator and components. Each component such as the a card data compiler 120, first math logic unit 140 may comprise its own housing. The card generator and its components may comprise a processor such as microprocessor, memory, software code stored in the memory for causing the processor to execute instructions, a system bus, and a network interface. The card generator may comprise a display.

Data Capture Logic

The card generator may comprise a data capture logic 110 configured to collect user information and a compiler configured to compile collected information into a data string. A math logic unit may hash the data string and transfer it to a database. The card generator may print and encode ID card using a card builder. The data capture logic may comprise a biographic capture device 111, biometric capture device 112, travel information capture device 113, data lookup function 114, and/or a pin receiver 115. The card generator may comprise a card data compiler 120 that may be configured to translate the data capture logic output 116 into a data string 121 optionally using a format adjustment logic 122. A card builder 130 may comprise a print setter 131, code generator 132, chip encoder 133, a card blank feeder 134 and/or a card printer 135 configured to generate the card 10. The output of the machine may be a card or document containing user information printed on the card, stored in a printed code, stored in a chip, and/or hashed into a hashed data string. The hashed data string may be stored in a database.

The biographic capture device 111 may be configured to capture biographic information from the user 1. Biographic information may be captured through accessing a database, requesting a user or operator type information with a keyboard, wireless connected with a computer operated by the user; etc. Biographic information may include name, DOB, address, social security number, driver's license numbers, work address, phone number, email address, social media handle, etc.

The biometric capture device 112 may be configured to capture biometric information from the user 1. Biometric information may be captured with a camera, fingerprint scanner, retina scanner, DNA scanner, or other biometric capture device. Biometric information may include headshots, pictures, fingerprint, retina scans, blood samples, etc.

The travel information capture device 113 may be configured to capture travel information from the user. The travel information capture device may comprise a ticket scanner for scanning a physical or electronic ticket presented by the user.

The data lookup function 114 may be configured to acquire at least one of biographic information and biometric information about the user from a user database 117. The data lookup function may comprise sending database commands to a database comprising user data. The database may be operated by the user, an entity controlling the card generator, or a third party database.

Pin Receiver

The pin receiver 115 may be configured to receive a user selected pin number. The pin receiver 115 may comprise an electronic pin pad or a mechanical pin pad. The pin receiver may also be configured to self-generate a pin number and provide the user with the pin number. The pin number can be a numeric, alphanumeric, alphabetic, or comprise other characters.

Card Data Compiler

The card data compiler 120 may be configured to compile data from at least one of the biographic capture device 111, biometric capture device 112, travel information capture device 113, data lookup function 114, and pin receiver 115. The data may be compiled into a data string 121 by the card data compiler 120. The data string may contain user information. In some configurations, the card data compiler 120 may compile data from all or some of the aforementioned components.

The card data compiler may be a software program executed by the card generator or it may be a specially designed circuit.

The card data compiler may comprise format adjustment logic 122 configured to adjust data the card data compiler 120 receives into a common format. Instructions in the format adjustment logic may allow the card data compiler, for example, to receive pin number from a variety pin receiver manufacturers. The format adjustment logic may also convert data receive from various models of biographic capture devices, biometric capture devices, pin receivers, and/or data lookup functions.

First and Second Math Logic Unit

The addition of a pin number makes it more difficult for an unauthorized user to use the ID, because a first math logic unit 140 can use the pin number as a part of a data string. The first math logic unit 140 may perform a one-way function on the data string 121 to generate a hashed data string 150. The card generator may store the hashed data string 150 in a hashed data string database 300. The hashed data string resolver 230 (see FIG. 2) may be configured to query the hashed data string database 300 to determine whether the hashed data string database 300 contains a record of the hashed data string 150. If a user enters an incorrect pin number during an authentication sequence, the card data compiler 120 will compile a data string with the incorrect pin number. Generation of a data string with an incorrect pin number may cause a second math logic unit 234 unit to generate a hashed data string that does not match an existing record (generated by the first math logic unit) in the hashed data string database. In some configurations the first math logic unit and the second logic math unit may be the same or different devices. A math logic unit is a device such as a microprocessor comprising circuits, tangible memory, and non-transitory computer readable code configured to cause the microprocessor to execute a sequence of instructions. A math logic unit may contain specialized instructions, for example, for performing one-way functions on a data string. The first math logic unit (and second math logic unit) may be configured to hash the data string into a hashed data string 150. The math logic unit may comprise logic and/or circuitry configured to apply a mathematical function to a value to generate a hash value. A math logic unit may contain or be connected to a power supply for powering the math logic unit with electricity. The first math logic unit may be connected to the card generator via system bus or a network interface.

The data string 150 may contain various characters and symbols. For example, the data string may be alphanumeric. The data string may contain a numerical representation of a headshot, a user's name, address, and phone number for example. Or, the data string may contain a numerical representation of a retina scan and phone number. The data string may comprise biometric information, biographic information, and/or travel plan information. Travel plan information may include port of departure, time of departure, flight number, etc.

The first math logic unit and second math logic unit may be configured to apply a one-way hash function to the data string. The one-way function may be configured so that it is relatively "easy" to compute in one direction, but very difficult or impossible to invert (perform in the opposite direction). A processor or math unit may process a one-way hash function in a forward direction. While a processor may be configured to perform inversion of the one-way hash function, a one-way hash function may be selected that is difficult or impossible to invert. The one-way hash function may be selected so that there are none or very few collisions (meaning that two different strings won't generate the same hash value.)

The term "easy" means that it takes far less clocks cycle to compute as compared to a function that is "difficult" takes far more clock cycles to compute. A function is "easy" in this application if it can be computed 50 times faster than its inverse function. A function is "difficult" in this application if it takes 50 times longer than its inverse function. So, if a function $f(x)=y$ takes 15 clock cycles, but the inverse of that function $f^{-1}(y)=x$ takes 800 clock cycles to compute, $f(x)$ is an easy function to compute and $f^{-1}(y)$ is a difficult function to compute.

In some cases, $f^{-1}(y)$ cannot be calculated. By analogy, the function of breaking a glass plate is relatively easy f(plate)=shattered . . . just drop the plate on a tiled floor. But the function of putting the plate back together f(shattered$^{-1}$)=plate is very difficult and time consuming (easily taking more than 50× the amount of time). The term easy and difficult in this context relates to amount of processor clock cycles and programming that would be required to implement the function.

Of course, one-way functions and one-way hash functions are well known in the art. The card generator may utilize secure one-way functions or resistance one-way functions as U.S. Pat. No. 11,477,017 incorporated by reference in its entirety; the SHA256, MD5, BLAKE, or BLAKE2 one-way hash functions as described in U.S. Pat. No. 11,620,387 incorporated by reference in its entirety; trap-door one-way functions, or other known one-way functions as described in U.S. Patent Application Publication No. 2021/0211282 incorporated by reference in its entirety.

Although the card generator 100 may be configured to hash sensitive personal identifiable data, it might not be necessary to maintain confidentiality of the one-way hash function itself. The one-way hash function may be publicly accessible to third parties, e.g., accessible on a website without a secure login. If it is very computationally difficult or impossible to invert the hashed values back into their data strings, the one-way function used in the card generator may be publicly known or unencrypted. For this reason, it might not be necessary to maintain the hashed values on an encrypted database. E.g., the hashed data string may be stored in an unencrypted database. If it is not possible or commercially practical to invert the hashed values, there may be no need to encrypt the database storing the values.

Some configurations of the hashed data string database may utilize a block-chain to protect and secure the data, while making the contents accessible to public users. Of course, many different types of databases may be used. Databases may include servers, data records stored on tangible computer readable media, and database management software designed to cause the processor of server to locate, store, and retrieve data. The database management software may be customized for certain configurations of the present invention. For example, the database access software may contain a value exists function which causes the processor of the database to search the data records in the database for a particular hashed data string and return a true or false value as the result.

The card generator 100 may be configured to send only the hashed value to the hashed value hashed data string database. The card generator 100 may be configured to send no other identifying data about the user to the hashed data string database. The card generator 100 may be configured to prevent transmission of any biographic information or biometric information associated with a user to the database 300. The card generator may be configured to filter data with a data filter to prevent transmission of any information to the hashed data string database other than the hashed data string.

Card Builder

The card generator 100 may comprise a card builder 130 configured to store the data string 121 on the ID card 10. The card builder may comprise a print setter 131 configured to generate printing data for the card generator. The printing data may contain the biographic information and biometric information user. The card builder may comprise a code generator configured to generate and/or print, on the card, a barcode, QR Code, alphanumeric code, or other machine readable code containing the data string. The code generator 132 may be configured to generate a code that is machine readable, but not directly readable/understandable by a human (such as a QR code). The card builder may comprise a chip encoder 133 configured to encode data into a chip on the ID card. The chip may be an EMV chip, RFID chip, or other electronic circuit capable of storing and transmitting information to a chip reader.

The encoded data may contain the data string 121. The card builder may comprise a card blank feeder 134 configured to hold a plurality of blank ID cards. The card blank feeder may be configured to feed the cards into a card intake in the card builder. The card builder may comprise a card printer configured to print the data string on the ID card.

Biometric Capture Device

In some configurations, the biometric capture device 111 may be configured to capture an image of the user's face; the chip encoder 133 may be configured store biometric information and/or the image in the chip; and the print setter 131 may be configured print the image on the card. In some configurations, the biometric capture device 111 may be configured to capture a retina scan of the user's retina; the chip encoder 133 may be configured store biographic information and/or the retina scan in the chip; the print setter may be configured print the retina scan on the card. In some configurations, the biometric capture device may be configured to capture a user's fingerprint; the chip encoder may be configured store biographic information and/or the fingerprint information in the chip; and the print setter 131 may be configured print the image on the card.

The card generator may be configured to generate other types of documents other than ID cards. For example, the card generator may be configured to generate documents such as include items like titles, registrations, tickets, contracts, deeds, warranties, etc. In some configurations, the card generator will comprise a code generator configured to print a barcode, QR code, or other machine code on the document or ID card. In some configurations a code (such as a barcode) may be preferable over an EMV chip because of cost or weight of the EMV chip.

Card Authenticator

Figure 2:
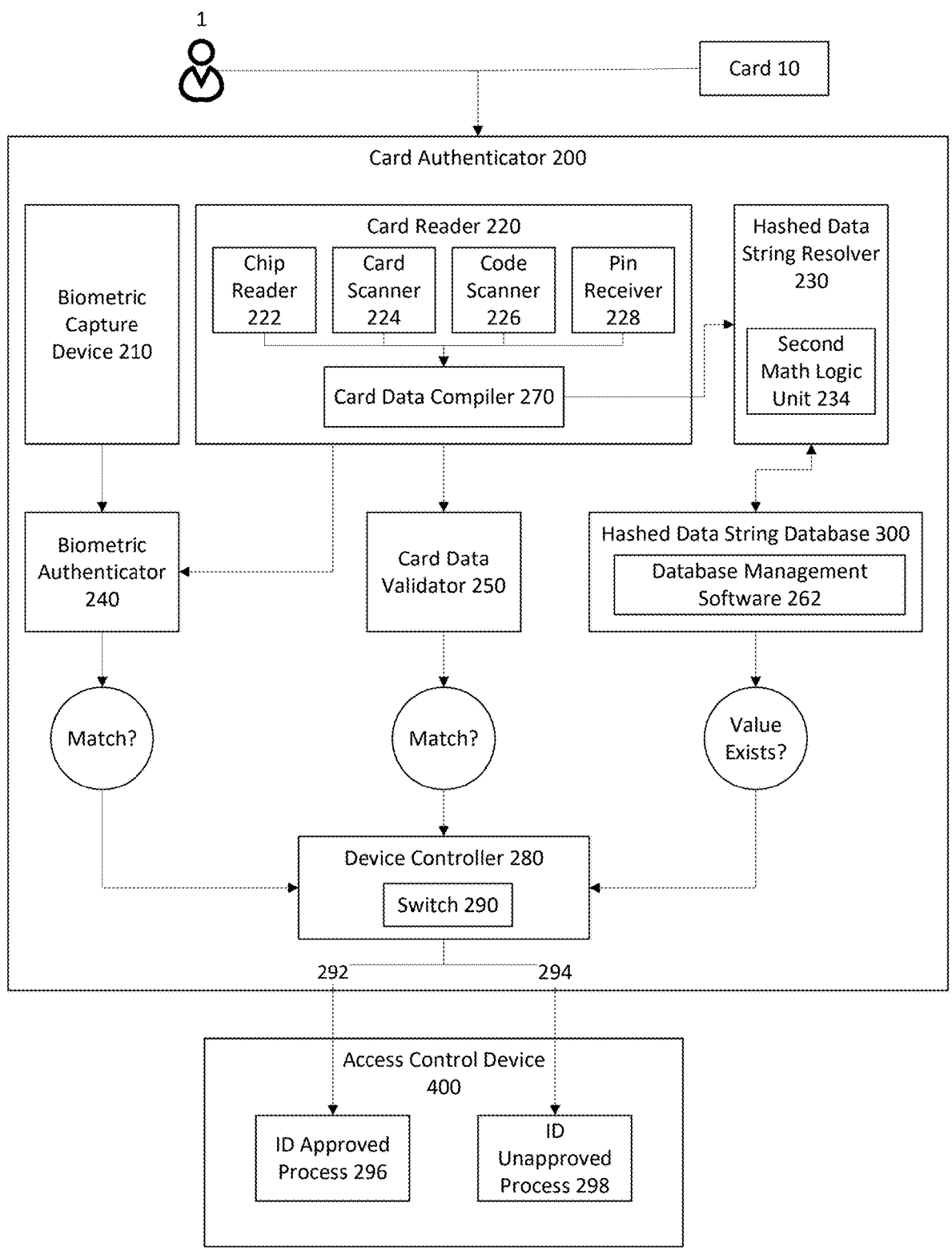
FIG. 2 is a schematic diagram of a card authenticator.

FIG. 2 illustrates a card authenticator 200 for authenticating an ID card containing user information printed on the ID card 10 associated with a user 1. The card authenticator may comprise components such as: a biometric capture device 210, a card reader 220, and a hashed data string resolver 230 with a second math logic unit 234. The circuitry and/or logic in the second math logic unit 234 in the card authenticator may contain some or all of the same circuitry and/or logic in the card generator 100. The card authenticator may comprise: a biometric authenticator 240, a card data validator 250, and a hashed data string database 260.

The hashed data string resolver 230 may receive a response from the hashed data string database 260 that indicates whether a hashed data string exists in the database. The second math logic unit 234 may comprise the hashed data string resolver 230. The biometric authenticator 240, card data validator 250, and hashed data string resolver 230 may comprise matching logic configured to determine (1) a user presenting the card has the same biometric information as the user that was issued the card, (2) whether the information on the card matches the information generated by the card generator, and (3) whether a correct pin number has been entered into the pin receiver.

A card authenticator is a machine configured to print cards. The card authenticator 200 may have an attached computer or be configured to connect to a computer. The card authenticator 200 may comprise a housing or a case. The card authenticator 200 may comprise a power supply for supplying electricity to the card authenticator and components. Each component such as the biometric capture device 210 or card reader 220 may comprise its own housing. The card authenticator and its components may comprise a processor such as a microprocessor, memory, software code stored in the memory for causing the processor to execute instructions, a system bus, and a network interface. The card authenticator may comprise a display.

Biometric Capture Device and Biometric Authenticator

The biometric capture device 210 may be configured to capture a proffered (first) biometric data, sample, or image from the user. The biometric authenticator may be configured to compare the proffered biometric sample against a biometric sample data on the card. The biometric capture device may have saved biometric data on the card in the form of printed image or stored the biometric data in the chip, barcode, etc. A chip reader 222, card scanner 224, code scanner 226, etc. may be used to scan or obtain information stored on the card 10. The card reader 220 may be configured to transfer the scanned or obtained information to the biometric capture device 210/biometric authenticator 240. The biometric authenticator may be configured to generate a positive biometric match when the first biometric data matches the second biometric data (optionally within a threshold.) The biometric authenticator 240 may be configured to generate a negative biometric match when the first biometric data does not match the second biometric data (optionally within a threshold.)

Card Data Validator

The card data validator 250 may be configured to determine whether information printed on the card (such as biographic data or a picture of the user) matches data stored in the chip 12 or barcode 18. The card data compiler 270 may be configured to collect information from the chip reader 222, card scanner 224, code scanner 226, and pin receiver 228. The card data compiler 270 may be configured to transfer the collected information to the hashed data string resolver 230.

The card data validator may use threshold matching or fuzzy matching to account to variations in image focus, white balance, lens smudges, etc. The optical character recognition might not be 100% accurate. The card data validator may employ threshold matching or fuzzy matching, so a 100% accurate OCR is not necessary. A threshold level for a match might be 2%, 5%, or 10% match based on character matching and/or word matching. E.g., if 98% of the characters in the image match the characters on the chip, the card data validator may determine a positive match within a 2% threshold. Conversely, if only 75% of the characters in the image match the characters from a barcode (for example), the card data validator may determine a negative match (or no match) within a 2% threshold.

Hashed Data String Resolver

The hashed data string resolver may be configured to determine whether information stored in a chip and/or printed on the card matches the information that was originally stored in the chip or printed on the card by the card generator. The hashed data string resolver 230 may be configured to generate (optionally using a second math logic unit 234) a first hash of the collected information from the card data compiler 270. The hashed data string resolver may be configured to request the hashed data string database to determine whether it contains an entry comprising a second hashed data string that matches (optionally within a threshold) the first hashed data string. The hashed data string database 300 may be configured to return a positive hashed data string match (e.g., value exists) if the hashed data string database identifies a matching entry. The hashed data string database 300 may be configured to return a negative hashed data string match if the hashed data string database does not identify a matching entry.

Device Controller

A device controller 280 and/or switch 290 may receive the output of the biometric authenticator 240, card data validator 250, and hashed data string resolver 230. The switch may comprise logic to determine whether send an ID approved 292 or ID unapproved signal 294 to the access control device 400. The device controller 280 may specify additional configurations options to the access control device such as a specific message to display on a monitor.

The card authenticator may comprise a second math logic unit 234. The math logic unit may be configured to perform a one-way function on the chip information to generate a hashed data string; send the hashed data string to the hashed data string database 300; and receive a response from the hashed data string database. The hashed data string database may comprise database management software 302 configured to store records in the database, search records, and return a response to a query. The response may contain hashed data string match information. The hashed data string match information may contain a true/false value, a number, a text string, or other indicator to the hashed data string resolver. The response from the hashed data string database may comprise a confirmation that the hashed data string database contains or does not contain a hashed data string that matches the sent hashed data string. The hashed data string resolver may be configured to receive the response from the hashed data string database.

Switch

The card authenticator may comprise a switch 290 comprising an input and an output. The input may be configured to receive match information. The output may be configured to cause the card authenticator to execute an identity approved process 296 or an identity unapproved process 298. An identity approved process is a sequence of steps, algorithm, and/or control transmissions that the device controller 280 is configured to send to an access control device to cause the access control device to take an action (e.g., unlock a locked door.) The input of the switch 290 may be configured to receive positive match information (positive match) and negative match information (negative match). The switch may comprise a first input configured to receive a positive or negative biometric match information from the biometric authenticator 240; a second input configured to receive a positive or negative syntax match from the card data validator 250; and a third input configured to receive a positive or negative hashed data string match information from the hashed data string database 300 or hashed data string resolver 230. The access control device may be configured to execute an identity approved process 296 or identity unapproved process 298.

ID Approved Process

The ID approved process may be a set of instructions, signal, or transmission to the an access control device. The ID approved process may be configured to cause the access control device to change from a first state to a second state. For example, an electronic gate can change from a latched position to an unlatched position, an electronic lock can change from a locked position to an unlocked position, an electronic hatch can change from a closed position to an open position, access to a panel can change from a restricted state to a granted state, an electronic door can change from a closed position to an open position, a computer terminal can change from an access restricted state to an access granted state, a display can change its message from stop to go. Conversely, an ID unapproved process may be configured to cause the access control device to change from the second state to the first state. The electronic door changes from opened to closed, an electronic phone changes from playing music to not playing music, etc. In some configurations, the access control device will automatically return to a previous state after a predetermined amount of time has transpired.

ID Unapproved Process

An identity unapproved process is a sequence of steps, algorithm, and/or control transmission that the device controller is configured to send to an access control device to cause the access control device to take an action (e.g., lock an unlocked door.) In some configurations, the card authenticator may be integrated into the access control device 400.

As shown in FIG. 2, a switch 290 and/or device controller 280 (which may be components of the card authenticator) may receive a negative match or information that the hashed data string resolver 230 does not exist in the hashed data string database 300. Receipt of the negative match or the information may cause the device controller to execute an identity unapproved process 298.

The card authenticator may comprise a chip reader configured to access user information stored in a chip attached to the ID card to obtain "chip information." The card authenticator may comprise a card scanner configured to scan information printed on the ID card to obtain "scanned information" optionally using optical character recognition. The card authenticator may comprise a card data validator configured to determine whether the chip information matches the scanned information within a threshold. The card data validator may be configured to generate a syntax match.

Hashed Data String Database

Figure 3:
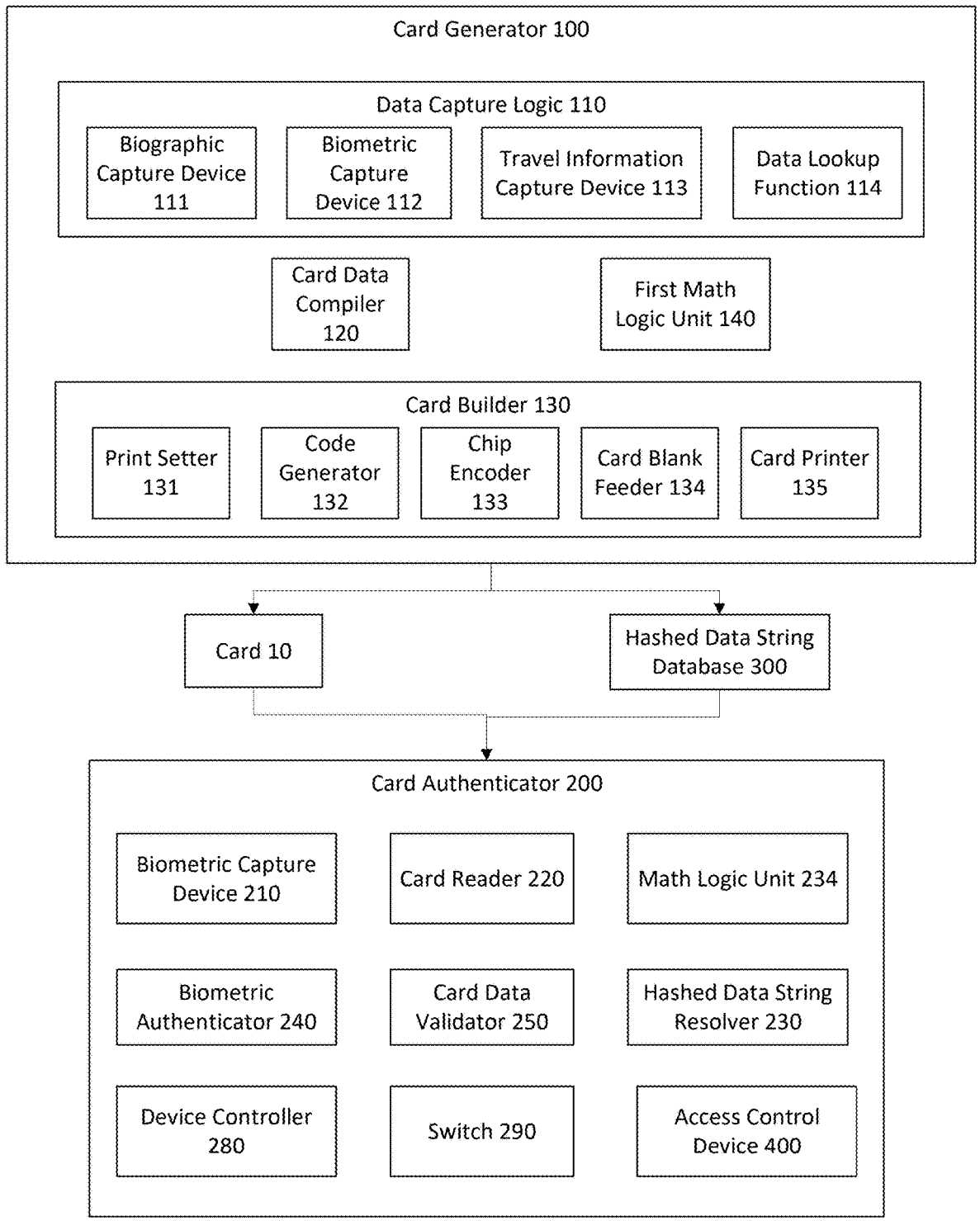
FIG. 3 is a system of a card generator and card authenticator.

FIG. 3, some configurations of the present invention may comprise a system containing a card authenticator and a card generator. The system may also comprise the hashed data string database 300 and other elements shown in FIGS. 1 and 2. The hashed data string database may be configured to store the hashed data strings without encryption. The hashed data string database may be configured to prevent storage of any personally identifiable information that hasn't been hashed. The hashed data string database may be configured to execute SQL queries from a public terminal. The hashed data strings (e.g., records) in the hashed data string database may be accessible by a public terminal. The hashed data strings (e.g., records) may be downloadable or copied by a public terminal. A public terminal may be a computer operated by another user that may have not been authenticated by the hashed data string database or card data validator. A visitor or anonymous visitor may be a person using a public terminal. The hashed data string database may require or may not require the visitor to log-in and provide a credential. The hashed data strings in the hashed data string database might not contain any information that can be used identify an associated user.

The hashed data string database may be an organized collection of structured information, or data, typically stored electronically in a computer or computer system. A database may be controlled by a database management system (DBMS). The database may also comprise a processor, storage, memory, a network interface, a display, keyboard, etc. Collectively, the data entries, structural components, and DBMS 302 are referred to as a database. Data with databases may be modeled in rows and columns in a series of tables to make processing and data querying efficient. Structured query language (SQL) may be used to write, query, and retrieve data. SQL is a programming language used by some relational databases to query, manipulate, and define data, and to provide access control. The database may take the form of a blockchain or relational database.

The database management software in the database 300 may be configured to store only hashed data strings. The database management software may be configured so that it cannot store any personally identifiable information about a user. The database 300 may be configured so that it will not store non-hashed user information.

FIG. 3 shows a system of the card generator 100, card authenticator 200, and hashed data string database 300. The card generator 100 may comprise a biographic capture device 111, a first biometric capture device 112, a card data compiler 120, a first math logic unit 140, and a card builder 130. The card authenticator 200 may comprise a second biometric capture device 210, a biometric authenticator 240, a second math logic unit 234, a switch 290, and a device controller 280. The first math logic unit 140 and second math logic unit 234 may be programmed to use the same algorithm so that given an identical data string, the first math logic unit and the math logic unit will produce the same result.

In FIG. 3, the device controller 280 and switch 290 are shown as separate, interconnected components. Also, FIG. 3 shows that the card authenticator 200 comprises the access control device 400. Such a configuration would exist if the embodiment featured an access control device integrated into the card authenticator (such as an electronic gate.) Other configurations are contemplated. The hashed data string database 300 and card 10 are shown as separate components.

Access Control Device

The card authenticator may comprise the access control device. The access control device 400 can comprise a processor, memory, network interface, a physical barrier, a camera, computer code configured to cause the processor to perform a sequence of instructions, and a housing. The access control device can be a computer, desktop, smartphone, wearable, etc. The access control device can be a door, lock, latch, box, gate, turnstile, or other barrier that blocks or restricts access or passage to a secure device, secure facility, or secure location. A secure device may be a laptop, terminal, circuit box, server, smart phone, weapon, vehicle, etc. A secure facility may be a shed, building, house, etc. A secure location may be an airport, airport gate, military base, room, desk, etc.

The access control device 400 may be configured to switch from a first position (first state) to a second position (second state) when it receives a control signal from the device controller 280 and/or switch 290. The first position or first state may be a state that physically blocks or restricts, legally blocks or restricts, or otherwise limits, denies, or reduces access to a secure device, secure facility, or secure location. The second position or second state may be a state that does not physically block or restrict, legally block or restrict, or otherwise limit or reduce access to a secure device, secure facility, or secure location. The second position or second state may be a state that grants or provides physical access, legal access, security access to the secure device, secure facility, or secure location.

The access control device 400 may be configured to comprise a default position/state (which might be the first position or second position.) The access control device may be configured to switch from the second position/state to the first position/state after an event occurs such as the passage of time period (5 seconds, 10 seconds, 1 minute, 5 minutes, 1 hour, 1 day, 10 days, etc.), a specific time and date in the future, an object or person is no longer detected within a preset radius of a sensor (e.g., a Bluetooth device is no longer within range of Bluetooth sensor); a user is no longer within a visible range of a camera connected to the access control device, a user no longer interacts with the access control device for a set period of time (e.g., a laptop logs out after a person stopped using the laptop for more than 15 minutes), etc.

Process Flows

Figure 4A:
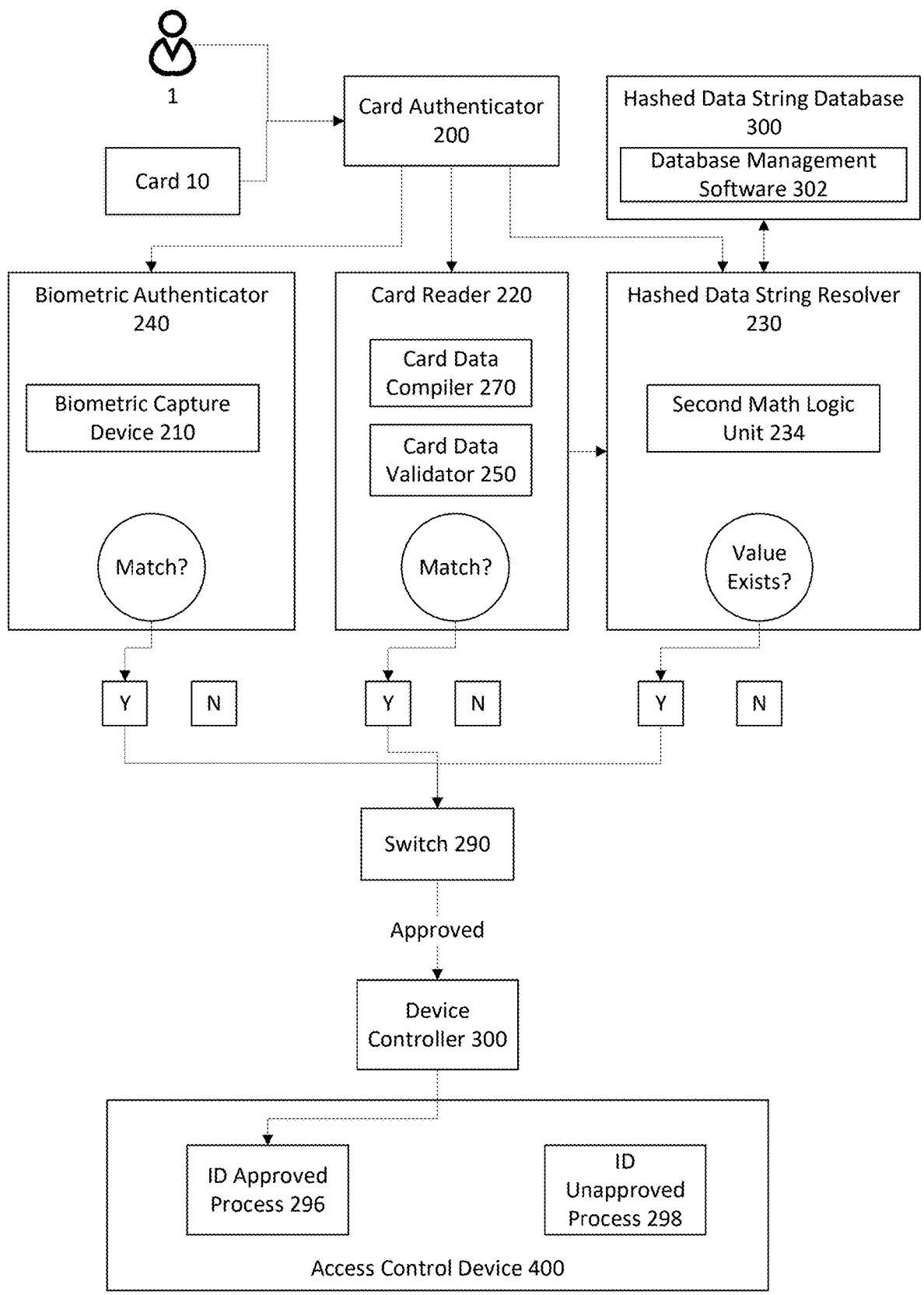
FIGS. 4A-4C are process flows for card authentication.

FIG. 4A illustrates a process flow wherein a card is presented to a card authenticator 200. A card reader 220 may be configured to obtain biometric information from the ID card. The card reader may also be configured to obtain biographic information from the ID card. The ID card may user information comprising biometric information, biographic information, and/or travel information. The card generator may store user information on the card in a printed form, on a chip (like an EMV chip), in a barcode, in a QR code, in another computer readable form, in a plurality of these forms, and/or in a combination of these forms (e.g., a chip and two barcodes.)

A card reader 220 may be configured to read and obtain user information from the card. The card reader may comprise a chip reader for reading chips, a card scanner for reading printed text, and a code scanner for reading barcodes or QR codes.

A biometric capture device 210 may be configured to acquire a biometric sample or data from the user. The card reader may be configured to obtain biometric data about the user from the ID card. A biometric authenticator 240 may determine that there is a biometric match between the user and the biometric data stored on the ID card (such as an image or fingerprint). The biometric authenticator 240 may determine that there is not a biometric match between the user and a biometric data stored on the ID card (such as an image or fingerprint). The determination may utilize a threshold matching algorithm to determine whether there is a positive match or a negative match.

The card reader 220 may comprise a card data compiler 270 configured to aggregate, read, and compile user information from the ID card (e.g., user information stored in a chip, printed form, barcode, or other computer readable form) into a data string. The data string may comprise user information including biometric information, biographic information, and/or travel information.

A second math logic unit 234 may be configured to perform a one-way function on the data string to form a hashed data string. A hashed data string resolver 230 may send a query to a hashed data string database. The query may request the database management software 302 in the database 300 to determine whether the database contains a record of the hashed data string. The database management software 302 may send a response to the hashed data string resolver indicating that the database 300 contains a record of the hashed data string. The database management software 302 may send a response to the hashed data string resolver indicating that the database does not contain a record of the hashed data string. The hashed data string resolver 230 may send the response to the switch (the responsive being positive or negative depending on the response from the hashed data string database).

A card data validator 250 may be configured to determine that card data stored in one form matches card data stored in a second form. For example, card data validator may be configured to determine whether data printed on the card matches data stored in the chip, barcode, or QR code.

In FIG. 4A, there is an exemplary process wherein the biometric authenticator is configured to determine that user supplied biometric information matches biometric information stored on the ID card. In other words, the user presenting the card may have the same biometric information as the biometric information stored on the card.

Also, in FIG. 4A, the card validator is configured determine that the user information printed on the ID card matches user information stored in a chip or computer readable code. The match may indicate that the user information printed on the card has not been modified.

A second math logic unit 234 may be configured to generate a hashed data string. The card data compiler may generate the data string. The data string may be comprised of biometric information, biographic information, a pin code, and/or travel information. The hashed data string resolver may send the hashed data string to a hashed data string database 300. Database management software 302 in the hashed data string database may be configured to determine whether there is a record of the same hashed data string in the database. The database management software may be configured to send a positive confirmation if the database management software identifies a matching record. The database management software 302 may be configured to send a negative confirmation if the database management software does not identify a matching record.

A switch 290 may be configured to receive output from the biometric authenticator 240, card reader 220, and hashed data string resolver 230. In certain configurations, the switch 290 can receive inputs from other components such as the card data validator, the second math logic unit 234, and hashed data string database 300. The card authenticator 200 may also send data to the switch. The card authenticator 200 may comprise the switch and other components shown in FIG. 4A. The device controller 280 may also comprise the switch. The switch may be programmed so that it will send an ID unapproved transmission/signal to the access control device or device controller unless the outputs from the biometric authenticator, card validator, and hashed data string resolver are positive outputs. Or, in some cases, the switch sends no signal at all. As shown in FIG. 4A, the hashed data string resolver returned a positive confirmation causing the device controller to output an ID approved process.

Figure 4B:
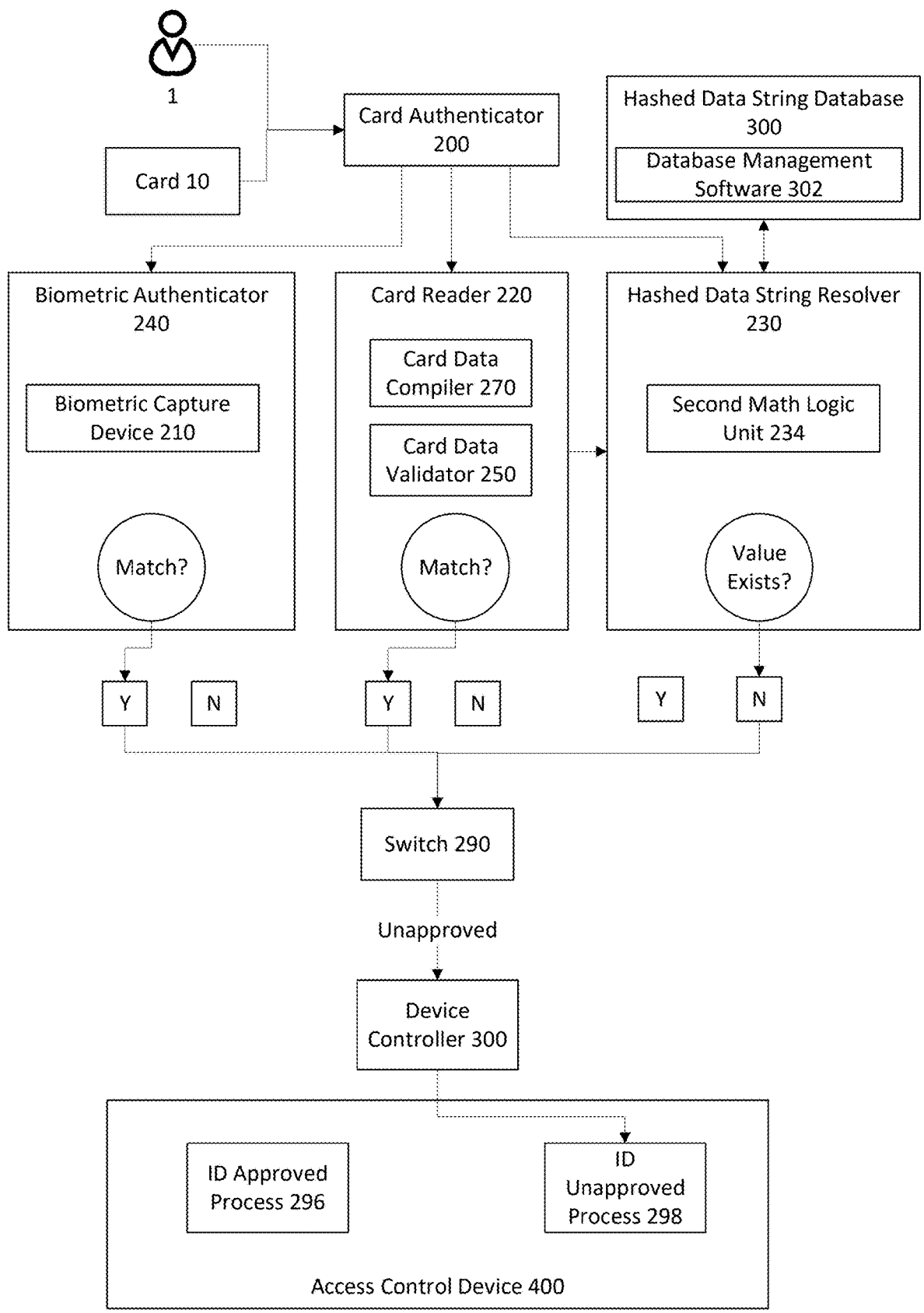

In FIG. 4B, the outputs from the biometric authenticator and card validator are positive outputs. The hashed data string resolver is a negative output. As shown in FIG. 4B, the hashed data string resolver returned a negative confirmation causing the device controller to output an ID unapproved process.

Figure 4C:
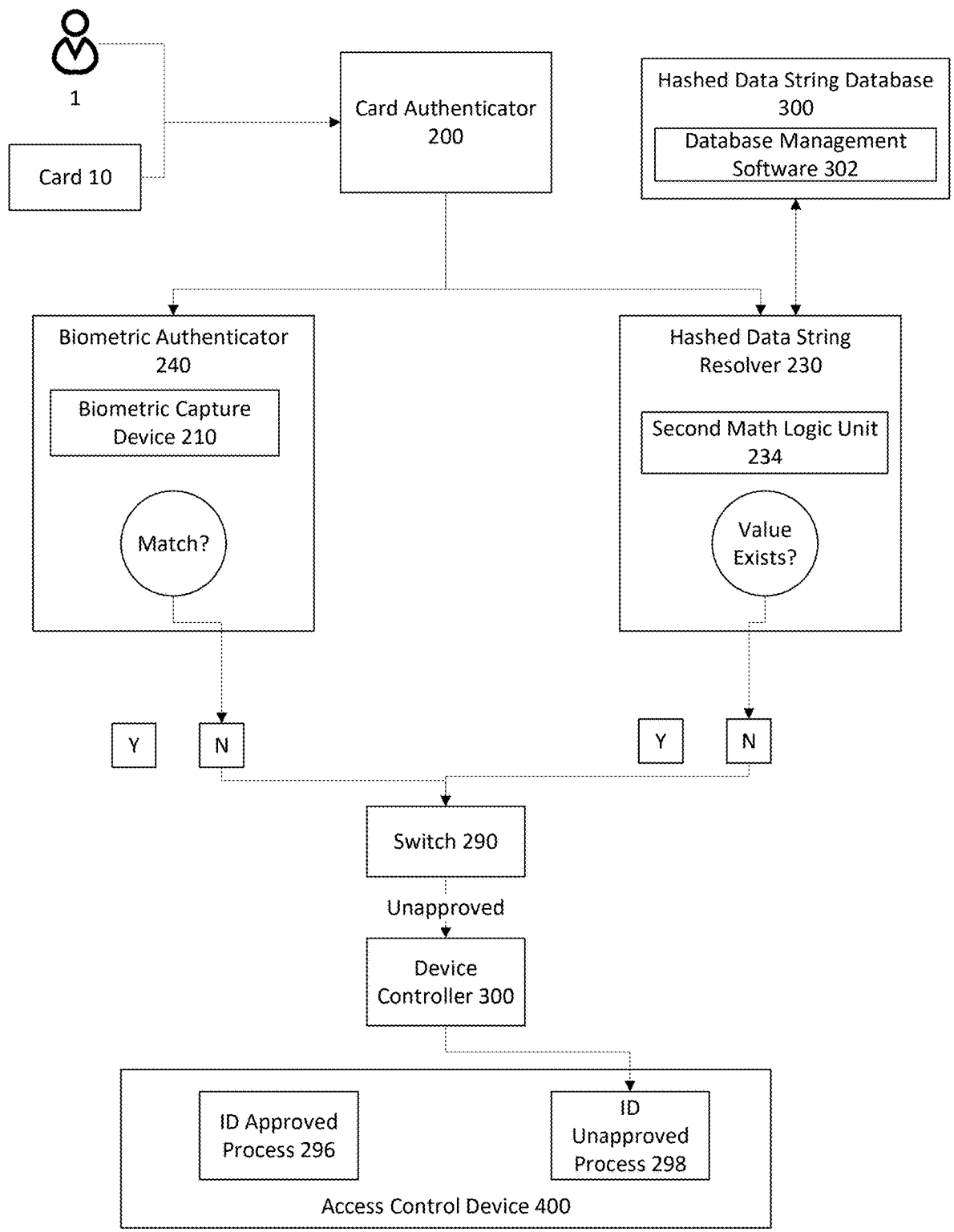

Some configurations might not contain all the components show in FIGS. 4A and 4B. For example, in FIG. 4C there is no card data validator, and the card reader does not output any data to the switch. However, the card reader may still be configured to collect all or some of the data from the ID card and send a data string to the hashed data string resolver.

CONCLUSION

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing system" encompasses all apparatus, devices, and machines for processing data, including by way of example a programmable processor, a computer, or multiple processors or computers. The system may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Embodiments and functional operations described in this specification may be implemented in digital electronic circuitry, or in computer software, firmware, or hardware, including the structures disclosed in this specification and their structural equivalents, or in combinations of one or more of them. For example, elements designated as engines, generators, identifiers, tools, analyzers, calculators, classifiers, checkers, finders, logic recorders, visualizers, aggregators, modules, nodes, managers, organizers, algorithms, etc. may be implemented in a variety of ways. A computer program (also known as a program, software, software application, script, or code) may be written in any form of programming language, including compiled or interpreted languages, and it may be deployed in any form, including as a standalone program or as a module, component, subroutine, or other unit suitable for use in a computing environment.

A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide interaction with a user, embodiments may be implemented on a computer having a display device, like a TV or monitor (CRT or LCD, etc.) for displaying information to the user. Computers may have peripherals like a keyboard, trackpad, mouse, etc. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computer and/or computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

Computer System

The invention may include or be connected to a computer comprising a hardware processor communicatively coupled to an instruction memory and to a data memory. The instruction memory can be configured to store, on at least a non-transitory computer-readable storage medium as described in greater detail below, executable program code. The hardware processor may include multiple hardware processors and/or multiple processor cores. The hardware processor may include hardware processors from different devices that cooperate. The computer system may execute one or more basic instructions included in the memory executable program code in instruction memory.

Relationship Between Hardware Processor and Executable Program Code

The relationship between the executable program code in the instruction memory and the hardware processor is structural; the executable program code is provided to the hardware processor by imparting various voltages at certain times across certain electrical connections, in accordance with binary values in the executable program code, to cause the hardware processor to perform some action, as now explained in more detail.

A hardware processor may be thought of as a complex electrical circuit that is configured to perform a predefined set of basic operations in response to receiving a corresponding basic instruction selected from a predefined native instruction set of codes.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor.

Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

Computer Program Product

A computer program product is an article of manufacture that has a computer-readable medium with executable program code that is adapted to enable a processing system to perform various operations and actions. Stated differently, the executable program code can embody or functionality of instructions that cause a computer, e.g., that cause the processor, to perform particular operations or processes.

A computer-readable medium may be transitory or non-transitory. A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

CONSIDERATIONS

For any computer-implemented embodiment, "means plus function" elements will use the term "means;" the terms "logic" and "module" have the meaning ascribed to them above and are not to be construed as generic "means." An interpretation under 35 U.S.C. § 112 (f) is desired only where this description and/or the claims use specific terminology historically recognized to invoke the benefit of interpretation, such as "means," or "means for" and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

The invention claimed is:

1. A card generator system for generating an ID (identity) card of a user, the card generator system comprising a processor and a memory storing a computer program code executable to cause the processor to:

capture biographic information from the user;

capture biometric information from the user;

compile a data string formed from data from at least one of the biographic and information or the biometric information;

hash the compiled data string into a hashed value, including sending only the hashed value to a hashed data string database, sending no other identifying data about the user to the hashed data string database, and filtering data to prevent transmission of any information to the hashed data string database other than a hashed data string; and store the data string on the ID card.

2. The card generator system of claim 1 comprising a pin pad configured to accept a pin code from the user.

3. The card generator system of claim 2 wherein the computer program code is executable to cause the processor to:
compile data from the biographic information, biometric information, and the pin pad; and
generate the data string containing the compiled data.

4. The card generator system of claim 1 wherein the computer program code is executable to cause the processor to generate a barcode containing the data string.

5. The card generator system of claim 1 wherein the computer program code is executable to cause the processor to:
encode data into a chip on the ID card; the encoded data containing the data string; and
generate printing data for the card generator system; the printing data containing the biographic information and biometric information.

6. The card generator system of claim 5 wherein the computer program code is executable to cause the processor to:
capture an image of the user's face;
store biographic information and the image in the chip; and
print the image on the ID card.

7. The card generator system of claim 5 wherein the computer program code is executable to cause the processor to:
capture a retina scan of the user's retina;
store biographic information and the retina scan in the chip; and
print the retina scan on the ID card.

8. The card generator system of claim 5 wherein the computer program code is executable to cause the processor to:
capture an image of a user's fingerprint;
store biographic information and fingerprint information in the chip; and
print the image on the ID card.

9. The card generator system of claim 1 further comprising a card blank feeder configured to hold a plurality of blank ID cards.

10. The card generator system of claim 1 further comprising a card printer configured to print the data string on the ID card.

11. The card generator system of claim 1 wherein the computer program code is executable to cause the processor to:
prevent transmission of any biographic information about the user to any database; and
prevent transmission of any biometric information about the user to any database.

12. A method for authenticating an ID card containing user information stored on the ID card associated with a user; the method comprising the steps of:
capturing biometric information from the user;
determining whether the captured biometric information matches a biometric information record on the ID card with a biometric authenticating circuitry;
generating a biometric information match with the biometric authenticating circuitry;
performing a one-way function on the user information to generate a hashed data string;
sending the hashed data string to a hashed data string database;
including sending only the hashed value to the hashed data string database, sending no other identifying data about the user to the hashed data string database, and filtering data to prevent transmission of any information to the hashed data string database other than a hashed data string;
receiving a response from the hashed data string database; the response containing hashed data string match information; receiving match information with an input of a switch;
generating a switch output with the switch;
sending a control transmission to an access control lock based the switch output of the switch;
the access control lock configured to switch from a first state to a second state based on receiving the control transmission; and
executing an identify approved process or an identity unapproved process with the access control lock.

13. A card authenticating system for authenticating an ID card containing user information stored on the ID card associated with a user the card authenticating system comprising a processor and a memory storing a computer program code executable to cause the processor to:
capture biometric information from the user;
determine whether the captured biometric information matches biometric information recorded on the ID card, and to generate a biometric information match;
perform a one-way function on the biometric information to generate a hashed data string;
send the hashed data string to a hashed data string database;
including sending only the hashed value to the hashed data string database, sending no other identifying data about the user to the hashed data string database, and filtering data to prevent transmission of any information to the hashed data string database other than a hashed data string;
receive a response from the hashed data string database; the response containing hashed data string match information;
receive match information by a switch to produce a switch output;
cause the card authenticating system, based on the switch output, to execute an identity approved process or an identity unapproved process;
send a control transmission to an access control lock based on the output of the switch; and
switch from a first state to a second data based on receiving the control transmission.

14. The card authenticating system of claim 13 further comprising:
a pin pad configured to accept a pin code from the user;
wherein the computer program code is executable to cause the processor to:
compile a data string from at least one of a chip reading circuitry, a card syntax scanning circuitry, a code scanning circuitry, or the pin pad;
send the data string to a hashed data string resolving circuitry; and
generate a hash of the data string.

15. The card authenticating system of claim 13 wherein the computer program code is executable to cause the processor to:
receive positive match information and negative match information by the switch; and
execute an ID approved process.

16. The card authenticating system of claim 13 comprising:
  a card scanning circuitry configured to:
    scan information printed on the ID card; and
    perform optical character recognition on the scanned information;
  wherein the computer program code is executable to cause the processor to determine whether the user information matches the scanned information within a threshold and to generate a syntax match.

17. The card authenticating system of claim 13 comprising:
  a chip reading circuitry configured to access information stored in a chip attached to the ID card to obtain chip information; and
  wherein the computer program code is executable to cause the processor to:
    determine whether the user information matches the chip information; and
    generate a chip information match.

18. The card authenticating system of claim 13 comprising:
  a code scanning circuitry configured to access information stored in a barcode or a QR code printed on the ID card to obtain code information; and
  wherein the computer program code is executable to cause the processor to determine whether the user information matches the code information and to generate a code information match.

19. The card authenticating system of claim 13 wherein the response comprises a confirmation that the hashed data string database contains a hashed data string that matches the sent hashed data string.

20. The card authenticating system of claim 13 wherein the response comprises a confirmation that the hashed data string database does not contain a hashed data string that matches the sent hashed data string.

21. The card authenticating system of claim 13 wherein the switch comprises:
  a first input configured to receive the biometric information match; and
  receive hashed data string match information from the hashed data string database.

22. A system comprising the card authenticating system of claim 13 and the hashed data string database; wherein the hashed data string database is configured to store hashed data strings without encryption.

23. A system comprising the card authenticating system of claim 13 and the hashed data string database; wherein the hashed data string database is configured to execute SQL queries from a public computer terminal; and the hashed data strings in the hashed data string database are accessible by the public computer terminal and are available to be downloaded or copied by the public computer terminal.

24. A system comprising the card authenticating system of claim 13 and the hashed data string database; wherein the hashed data strings in the hashed data string database do not contain any information that is used identify an associated user.

25. The card authenticating system of claim 13 wherein the computer program code is executable to cause the processor to cause a state of the access control lock to change from a first state to a second state;
  signal a gate, door, hatch, panel, or a lock to open or close;
  grant or deny access to a computer or a physical location; or display a symbol designating whether the user's asserted identity matches a subset of the hashed data string database.

26. The card authenticating system of claim 13 wherein the card authenticating system is integrated into the access control lock.

27. The card authenticating system of claim 13 wherein;
  a positive match indicates that the captured biometric information matches biometric information obtained by a card reading circuitry;
  the response indicates that the hashed data string database does not contain a hashed data string that matches the sent hashed data string; and
  computer program code is executable to cause the processor to generate a negative match indicating that the sent hashed data string does not match any hashed data strings previously stored in the hashed data string database.

28. A system comprising a card generator system for generating an ID card of a user and a card authenticating system for authenticating the ID card; the ID card containing printed user information associated with the user; the system including a processor and a memory, said card generator system comprising a card generator computer program code stored in the memory and executable to cause the processor to:
  capture biographic information from the user;
  capture first biometric information from the user;
  compile data from at least one of the biographic information or the first biometric information;
  hash the data string into a hashed value using a one-way hash function;
  send the hashed value to a hashed data string database;
  including sending only the hashed value to the hashed data string database, sending no other identifying data about the user to the hashed data string database, and filtering data to prevent transmission of any information to the hashed data string database other than a hashed data string;
  store the data string on the ID card; and said card authenticating system comprising a card authenticating computer program code stored in the memory and executable to cause the processor to:
  capture second biometric information from the user;
  determine whether the captured biometric information matches biometric information recorded on the ID card and to generate or not generate a positive biometric information match based on the determination;
  obtain user information from the ID card;
  perform the one-way hash function on the user information to generate a second hashed data string;
  send the second hashed data string to a hashed data string database;
  query the hashed data string database to determine whether the database comprises a hashed data string that matches second hashed data string database;
  generate a response comprising a positive hashed data string match;
  the system further including a switch comprising an input and an output;
    the input configured to receive match information; and
    the output configured to send a control transmission to an access control lock based on the input of the switch.

29. The system of claim 28 wherein the card authenticating computer program code is executable to cause the processor:
   obtain scanned information from text on the card;
   obtain chip information from a chip on the card;
   generate a positive syntax match based on a comparison of the scanned information and chip information;
   wherein the input of the switch is further configured to receive a positive biometric information match, a positive syntax match, and a positive hashed data string match; and
   wherein the output of the switch configured to send an identity approved process to the switch.

30. The system of claim 28 wherein:
   the one-way hash function is publicly accessible to third parties without a secure login;
   the hashed data strings are stored unencrypted in a public database that does not require a secure login; and
   the one-way hash function is configured so that inversion of the one-way hash function is difficult or impossible for a processor to perform.

\* \* \* \* \*